US012636879B2

(12) United States Patent (10) Patent No.: US 12,636,879 B2
Komatsu et al. (45) Date of Patent: May 26, 2026

(54) RECORDING SYSTEM, RECORDING DEVICE, AND CONTROL METHOD

(71) Applicant: SEIKO EPSON CORPORATION, Tokyo (JP)

(72) Inventors: Yuki Komatsu, Shiojiri (JP); Hiroki Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 18/519,157

(22) Filed: Nov. 27, 2023

(65) Prior Publication Data

US 2024/0173959 A1 May 30, 2024

(30) Foreign Application Priority Data

Nov. 28, 2022 (JP) ................................. 2022-189068

(51) Int. Cl.
*B41J 2/01* (2006.01)
*H04N 1/00* (2006.01)

(52) U.S. Cl.
CPC ............ *B41J 2/01* (2013.01); *H04N 1/00411* (2013.01); *B41J 2002/012* (2013.01)

(58) Field of Classification Search
CPC ........... H04N 1/00188; H04N 1/00408; H04N 1/00411; B41J 3/46; B41J 29/46; B41J 13/0009; B41J 13/0036; B41J 2/01; B41J 2002/012; B41J 29/38; B41J 13/0054; B41J 11/007; G06F 3/12
See application file for complete search history.

(56) References Cited

U.S. PATENT DOCUMENTS

2018/0141351 A1* 5/2018 Watanabe ............ B41J 13/0009

FOREIGN PATENT DOCUMENTS

JP 2004062951 2/2004
JP 2005-035683 A 2/2005

* cited by examiner

*Primary Examiner* — Jannelle M Lebron
(74) *Attorney, Agent, or Firm* — WORKMAN NYDEGGER

(57) ABSTRACT

A recording system includes a recorder configured to eject a liquid to perform recording on a recording surface of a medium, a first discharger, a second discharger, and an external controller. The first discharger configured to discharge the medium on which recording is performed by the recorder, is configured to discharge the medium with the recording surface facing down. The second discharger configured to discharge the medium on which recording is performed by the recorder, is configured to discharge the medium with the recording surface facing up. In the recording system, the external controller is configured to, when a predetermined medium is set as an object on which recording is to be performed, output a message that provides a warning not to touch the recording surface of the predetermined medium.

15 Claims, 3 Drawing Sheets

RECORDING SYSTEM, RECORDING DEVICE, AND CONTROL METHOD

The present application is based on, and claims priority from JP Application Serial Number 2022-189068, filed Nov. 28, 2022, the disclosure of which is hereby incorporated by reference herein in its entirety.

BACKGROUND

1. Technical Field

The present disclosure relates to a recording system, a recording device, and a control method.

2. Related Art

As disclosed in, for example, JP-A-2005-35683, an image forming apparatus is an exemplary recording device that ejects ink, which is an exemplary liquid, from a recording head to perform recording on a sheet of paper, which is an exemplary medium. The image forming apparatus includes an opening-closing transport member. The image forming apparatus opens and closes the opening-closing transport member in accordance with the elasticity of paper, thereby switching between paths for transporting a sheet of the paper.

When the opening-closing transport member is in the closed state, the paper sheet is discharged into a discharge tray with the image surface, which is an exemplary recording surface, facing down. When the opening-closing transport member is in the open state, the paper sheet is discharged into an inverted discharge tray with the image surface facing up.

For some of the media, it takes time for the recording surface to dry. If the recording surface that has not dried up is touched, an undried liquid may be out of position of the medium or be removed, and thus the recording quality may be reduced. However, when the medium is discharged with the recording surface facing down, the recording surface is invisible to the user and therefore there is a chance that the user might touch the recording surface.

SUMMARY

According to an aspect of the present disclosure, a recording system includes a recorder configured to eject a liquid to perform recording on a recording surface of a medium; a first discharger configured to discharge the medium on which recording is performed by the recorder, the first discharger being configured to discharge the medium with the recording surface facing down; a second discharger configured to discharge the medium on which recording is performed by the recorder, the second discharger being configured to discharge the medium with the recording surface facing up; and a controller. In the recording system, the controller is configured to, when a predetermined medium is set as an object on which recording is to be performed, output a message that provides a warning not to touch the recording surface of the predetermined medium.

According to another aspect of the present disclosure, a recording device includes a recorder configured to eject a liquid to perform recording on a recording surface of a medium; a first discharger configured to discharge the medium on which recording is performed by the recorder, the first discharger being configured to discharge the medium with the recording surface facing down; a second discharger configured to discharge the medium on which recording is performed by the recorder, the second discharger being configured to discharge the medium with the recording surface facing up; a reporter; and a controller. The controller is configured to, when a predetermined medium is discharged by the first discharger, cause the reporter to report a message that provides a warning not to touch the recording surface of the predetermined medium.

According to still another aspect of the present disclosure, disclosed is a control method for controlling a recording device including a recorder configured to eject a liquid to perform recording on a recording surface of a medium, a first discharger configured to discharge the medium on which recording is performed by the recorder, the first discharger being configured to discharge the medium with the recording surface facing down, and a second discharger configured to discharge the medium on which recording is performed by the recorder, the second discharger being configured to discharge the medium with the recording surface facing up. The control method includes, when a predetermined medium is set as an object on which recording is to be performed, outputting a message that provides a warning not to touch the recording surface of the predetermined medium.

DESCRIPTION OF EMBODIMENTS

First Embodiment

An embodiment of a recording system, a recording device, and a control method will be described below with reference to the accompanying drawings. An example of the recording device is an ink jet printer that ejects ink, which is an exemplary liquid, on a medium such as paper.

Recording System

Figure 1:
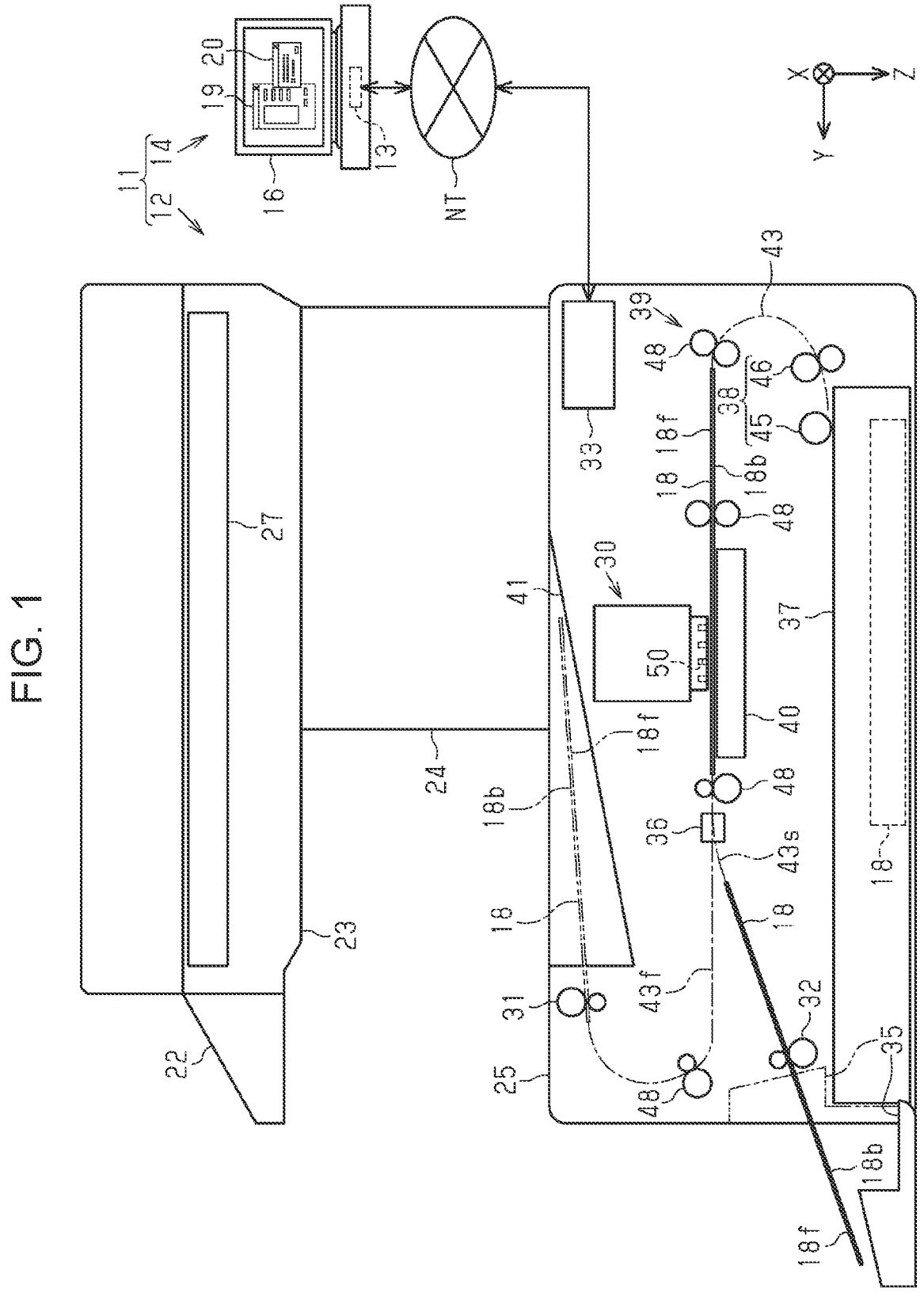
FIG. 1 is a diagram illustrating an embodiment of a recording system.

As illustrated in FIG. 1, a recording system 11 may include a recording device 12 and an external controller 13, which is an exemplary controller. The recording system 11 may include an external device 14. The external device 14 may include the external controller 13.

In the figure, assuming that the recording device 12 and the external device 14 are placed on a horizontal plane, the direction of gravity is represented by the Z-axis and the directions of the horizontal plane are represented by the X-axis and the Y-axis. The X-axis, Y-axis, and Z-axis are perpendicular to each other. In the description given below, the direction parallel to the X-axis may be referred to as a width direction X, the direction parallel to the Y-axis as a depth direction Y, and the direction parallel to the Z-axis as a vertical direction Z.

The external controller 13 may comprehensively control the driving of mechanisms in the external device 14 to control various operations performed in the external device 14. The external controller 13 according to the present embodiment is a driver installed for communication with the recording device 12.

The recording device 12 and the external controller 13 are either coupled directly or connected via a network NT. The terms "coupled" and "connected" used here mean electrical coupling and electrical connection, respectively, which are not limited to being wired and may be wireless. The recording device 12 and the external device 14 coupled or connected to each other are able to communicate with each other.

The external device 14 may be, for example, a personal computer, a smartphone, a tablet computer, or the like. The external device 14 may include a display 16. The display 16 may be, for example, a monitor, a touch panel, or the like. The external controller 13 may cause information on the recording system 11, on the recording device 12, and on recording performed by the recording device 12 to be displayed on the display 16.

The external controller 13 may output, to the display 16, a setting screen 19 for selecting the type of the medium 18. The user may make settings regarding recording on the setting screen 19. On the setting screen 19, it is possible to select the medium 18 for recording using the recording device 12. On the setting screen 19, it may be possible to select a discharger for discharging the medium 18 on which recording is performed. The external controller 13 outputs the set information to the recording device 12.

The external controller 13 may output, to the display 16, a message 20 that provides a warning not to touch a recording surface 18*f* of a predetermined medium 18. The external controller 13 may output the message 20 when the predetermined medium 18 is selected on the setting screen 19. The predetermined medium 18 is, for example, photo paper. The predetermined medium 18 is, for example, the medium 18 that is resistant to liquid penetration, such as coated paper or glossy paper, and for which it takes time for the recording surface 18*f* to dry. The message 20 may include characters and images. The display 16 provides a report to the user by displaying the message 20.

Recording Device

As illustrated in FIG. 1, the recording device 12 may include a reporter 22, a reading main body 23, one or more supports 24, and a device main body 25.

The reporter 22 may include a monitor, a touch panel, or the like and provide a report to the user by displaying the message 20 in the same manner as the display 16. The reporter 22 may include a speaker that provides a report by emitting sound. The reporter 22 may provide a report by providing audio or may provide a report by providing a warning sound. The reporter 22 may include a light that provides a report by emitting light. The reporter 22 may provide a report by using light, for example, to make the message 20 stand out or may provide a report by switching on and off light.

The reading main body 23 includes a reader 27 that reads an original document. The supports 24 support the reading main body 23. The reading main body 23 may be disposed above the device main body 25 in the vertical direction Z. The reading main body 23 may be disposed at an interval from the device main body 25 in the vertical direction Z.

The recording device 12 includes a recorder 30, a first discharger 31, a second discharger 32, and a subordinate controller 33, which is an exemplary controller. The recorder 30, the first discharger 31, and the second discharger 32 may be included in the device main body 25. The device main body 25 may include a discharge cover 35, a switching mechanism 36, a containing cassette 37, a feeder 38, a transporter 39, a supporter 40, and a stacker 41.

In FIG. 1, a transport path 43 for transporting the medium 18 is represented by a dash-dot line. The transport path 43 is a path linking the containing cassette 37 and the first discharger 31 or the second discharger 32. The transport path

43 branches at some point to a first discharge path 43*f* leading to the first discharger 31 and a second discharge path 43*s* leading to the second discharger 32.

The discharge cover 35 may open and close around an axis (not illustrated). The discharge cover 35 according to the present embodiment is able to move to an open position represented by a solid line in FIG. 1 and to a closed position represented by a dash-dot-dot line in FIG. 1. The rotation axis of the discharge cover 35 may be provided in the containing cassette 37. The containing cassette 37 may be pulled out by pulling the discharge cover 35.

The switching mechanism 36 switches the paths for transporting the medium 18 using, for example, a flap. The switching mechanism 36 may switch the paths in accordance with the opening and closing of the discharge cover 35. For example, when the discharge cover 35 located at the open position moves to the closed position, the switching mechanism 36 may switch a path for transporting the medium 18 from the second discharge path 43*s* to the first discharge path 43*f*. That is, when the discharge cover 35 is located at the closed position, the medium 18 is discharged by the first discharger 31. For example, when the discharge cover 35 located at the closed position moves to the open position, the switching mechanism 36 may switch a path for transporting the medium 18 from the first discharge path 43*f* to the second discharge path 43*s*. When the discharge cover 35 is located at the open position, the medium 18 is discharged by the second discharger 32.

The containing cassette 37 may contain a plurality of sheets of the medium 18 in a stacked state.

The feeder 38 may include a pickup roller 45 and a separation roller 46. The pickup roller 45 rotates while being in contact with sheets of the medium 18 contained in the containing cassette 37, thereby feeding the top sheet of the medium 18 to the separation roller 46. The separation roller 46 pushes down the second and subsequent sheets of the medium 18 from the top, thereby separating the sheets of the medium 18 one by one. The feeder 38 feeds the sheets of the medium 18 contained in the containing cassette 37 one by one to the transport path 43.

The transporter 39 transports the sheet of the medium 18 along the transport path 43. The transporter 39 may include a plurality of transport rollers 48 disposed along the transport path 43. The transport rollers 48 may transport the sheet of the medium 18 by rotating while pinching the sheet of the medium 18.

The supporter 40 may be disposed at a location facing the recorder 30 across the transport path 43. The supporter 40 may support at least a portion of the sheet of the medium 18 at which recording is to be performed.

The recorder 30 may include a plurality of nozzles 50 that eject a liquid. The recorder 30 ejects a liquid to perform recording on a recording surface 18*f* of the medium 18. The recording surface 18*f* is a surface facing the nozzles 50 and is a surface opposite to a back surface 18*b* that comes in contact with the supporter 40.

The first discharger 31 is a discharger that discharges a sheet of the medium 18 on which recording is performed by the recorder 30. The first discharger 31 discharges the sheet of the medium 18 with the recording surface 18*f* facing down. The first discharger 31 discharges the sheet of the medium 18 in a so-called face-down manner. The first discharger 31 may be disposed between the device main body 25 and the reading main body 23 in the vertical direction Z.

The stacker 41 may be disposed on the upper surface of the device main body 25. The stacker 41 receives the medium 18 discharged by the first discharger 31. The first discharger 31 and the stacker 41 may be located rearward of the reporter 22 in the depth direction Y. In other words, the reporter 22 may be disposed at a location where the reporter 22 is more noticeable than the stacker 41 to the user located in front of the recording device 12 in the depth direction Y. The first discharger 31 includes, by way of example, a discharge roller pair for discharging the medium 18.

The second discharger 32 is a discharger that discharges the medium 18 on which recording is performed by the recorder 30. The second discharger 32 discharges the medium 18 with the recording surface 18f facing up. The second discharger 32 discharges the medium 18 in a so-called face-up manner. The second discharger 32 may be disposed in front of the first discharger 31 in the depth direction Y. The discharge cover 35 located at the open position may receive the medium 18 discharged by the second discharger 32. The second discharger 32 includes, by way of example, a discharge roller pair for discharging the medium 18.

Figure 2:
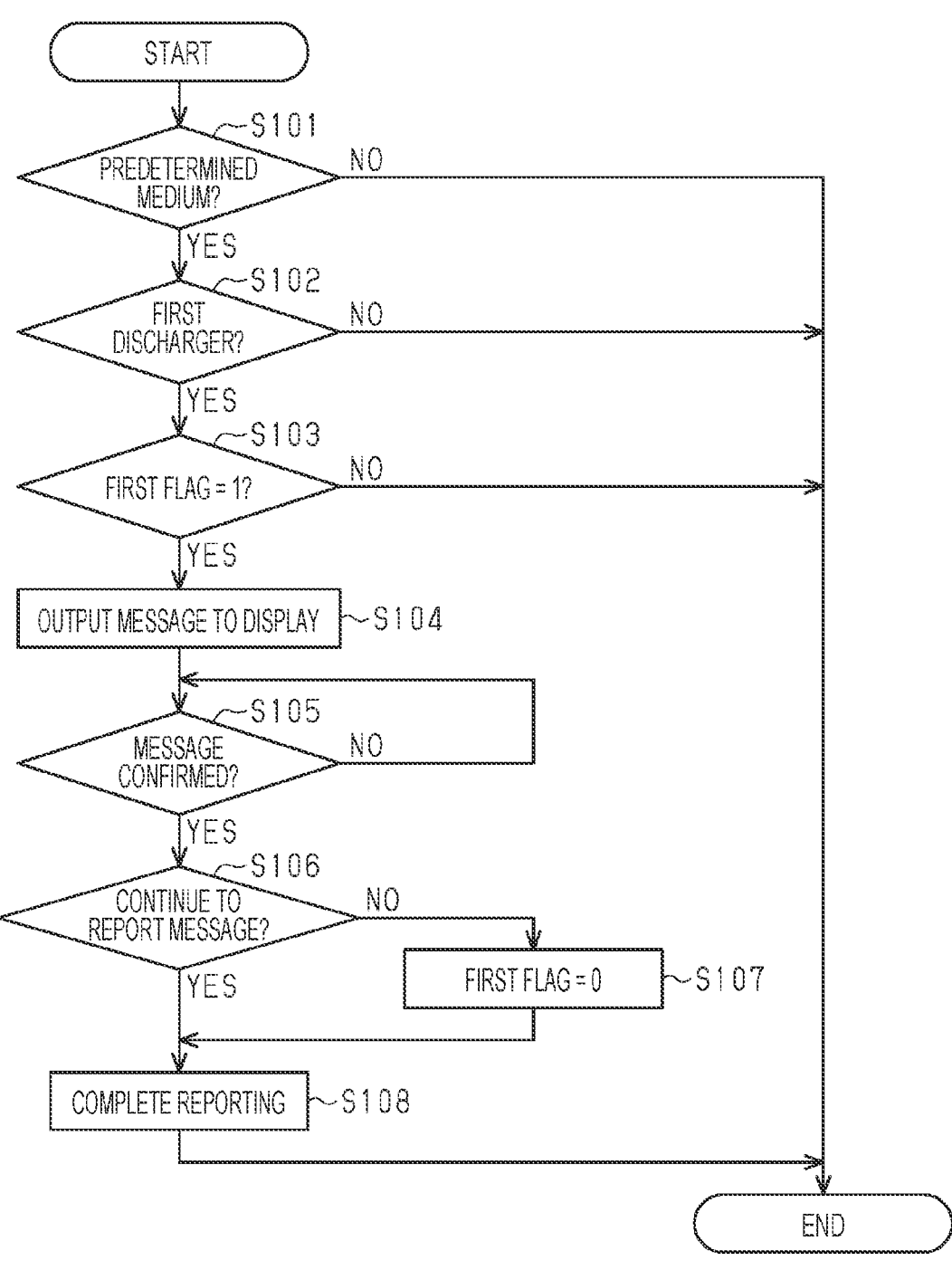
FIG. 2 is a flowchart illustrating a medium selection routine.

The subordinate controller 33 comprehensively controls the driving of mechanisms in the recording device 12 to control various operations performed in the recording device 12. The subordinate controller 33 may be configured as a circuit including a: one or more processors that execute various types of processing according to a computer program, B: one or more dedicated hardware circuits that execute processing of at least some of the various types of processing, or y: a combination thereof. The hardware circuit is, for example, an application-specific integrated circuit. The processor includes a central processing unit (CPU) and memories, such as a random access memory (RAM) and a read-only memory (ROM), and the memories store program codes or instructions configured to cause a process to be executed by the CPU. The memories, that is, computer-readable media include any readable media accessible by a general-purpose or specific-purpose computer.
Control Method With reference to the flowcharts illustrated in FIGS. 2 and 3, a control method for controlling the recording device 12 will be described.
Medium Selection Routine According to the present embodiment, a medium selection routine illustrated in FIG. 2 is executed by the external controller 13. The external controller 13 may execute the medium selection routine at a time when the medium 18 is selected on the setting screen 19.

As illustrated in FIG. 2, at step S101, the external controller 13 determines whether the predetermined medium 18 is selected as the medium 18 on which recording is to be performed. If the selected object is not the predetermined medium 18, the determination at step S101 is NO, and the external controller 13 terminates the process. If the selected object is the predetermined medium 18, the determination at step S101 is YES, and the external controller 13 proceeds to step S102.

At step S102, the external controller 13 may determine whether the first discharger 31 is set as a discharger that discharges the predetermined medium 18. The discharger setting may be performed by the user or may be performed by using a program in accordance with the medium 18 that has been set. On the setting screen 19, when the predetermined medium 18 is selected, the external controller 13 may set the first discharger 31 as a discharger that discharges the predetermined medium 18. A detector (not illustrated) that detects opening and closing of the discharge cover 35 may be provided, and the first discharger 31 may be set as a discharger that discharges the predetermined medium 18 based on a detection result of the detector.

If the second discharger 32 is set, the determination at step S102 is NO, and the external controller 13 terminates the process. Therefore, when, on the setting screen 19, the predetermined medium 18 is selected and the second discharger 32 is set as a discharger that discharges the predetermined medium 18, the external controller 13 does not output the message 20. If the first discharger 31 is set, the determination at step S102 is YES, and the external controller 13 proceeds to step S103.

At step S103, the external controller 13 may determine whether the first flag is set to 1. The first flag is stored in a nonvolatile storage. In a new state, prior to the first use, the first flag is set to 1. If the first flag is 0, the determination at step S103 is NO, and the external controller 13 terminates the process. If the first flag is 1, the determination at step S103 is YES, and the external controller 13 proceeds to step S104.

At step S104, the external controller 13 outputs the message 20. The control method for the recording device 12 includes a step of outputting the message 20 when the predetermined medium 18 is set as an object on which recording is to be performed. Specifically, the external controller 13 causes the display 16 to display the message 20. In conjunction with the display of the message 20, the external controller 13 may prompt the user to confirm the message 20 and may also request the user to specify whether the message 20 is to be displayed in future.

At step S105, the external controller 13 determines whether the user has confirmed the message 20. If information indicating that the message 20 has been confirmed is not acquired, the determination at step S105 is NO, and the external controller 13 waits until obtaining the information indicating that the message 20 has been confirmed. That is, after outputting the message 20, the external controller 13 causes the message 20 to be reported until receipt of information indicating that the user has confirmed the message 20.

The user may select a confirmation button displayed, for example, on the display 16 to indicate that the message 20 has been confirmed. If the information indicating that the message 20 has been confirmed is obtained, the determination at step S105 is YES, and the external controller 13 proceeds to step S106.

At step S106, the external controller 13 determines whether to continue to display the message 20. If information indicating that the message 20 is unnecessary is obtained, the determination at step S106 is NO, and the external controller 13 proceeds to step S107. At step S107, the external controller 13 sets the first flag to 0.

Figure 3:
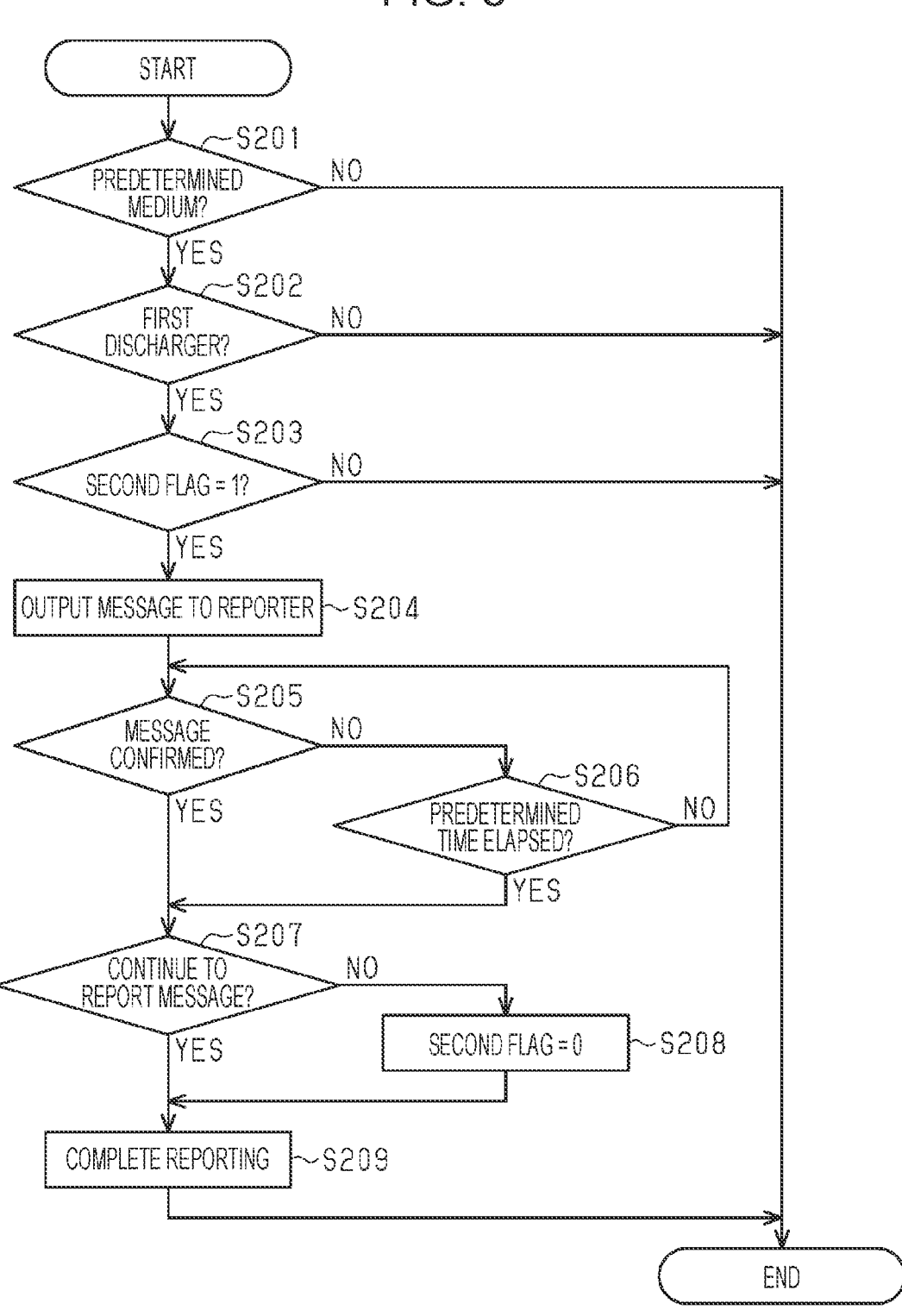
FIG. 3 is a flowchart illustrating a recording routine.

If the information indicating that the message 20 is unnecessary is not obtained, the determination at step S106 is YES, and the external controller 13 proceeds to step S108 while the first flag remains set to 1. At step S108, the external controller 13 completes reporting. That is, the external controller 13 clears the message 20 displayed on the display 16.
Recording Routine According to the present embodiment, a recording routine illustrated in FIG. 3 is executed by the subordinate controller 33. The subordinate controller 33 may execute the recording routine at a time when the recording starts. The subordinate controller 33 may also execute the recording routine at a time when the medium 18 on which recording is performed is discharged. The subordinate controller 33 may acquire, as well as information on the start of recording, information on recording, such as the type of the medium 18 and a discharger that discharges the medium 18, from the external controller 13.

In the case where the recording routine is executed at the time when the recording starts, the subordinate controller 33 outputs the message 20 after receiving an input for starting recording on the predetermined medium 18. In the case where the recording routine is executed at the time when the medium 18 on which recording is performed is discharged, the subordinate controller 33 outputs the message 20 after the predetermined medium 18 has been discharged by the first discharger 31.

As illustrated in FIG. 3, step S201 and step S202 are the same as the step S101 and step S102, and therefore description is omitted.

At step S203, the subordinate controller 33 may determine whether the second flag is set to 1. The second flag is stored in a nonvolatile storage. In a new state, prior to the first use, the second flag is set to 1. If the second flag is set to 0, the determination at step S203 is NO, and the subordinate controller 33 terminates the process. If the second flag is set to 1, the determination at step S203 is YES, and the subordinate controller 33 proceeds to step S204.

At step S204, the subordinate controller 33 outputs the message 20 to the reporter 22. The reporter 22 reports the message 20 output by the subordinate controller 33. In conjunction with the reporting of the message 20, the subordinate controller 33 may prompt the user to confirm the message 20 and may also request the user to specify whether the message 20 is to be reported in future.

At step S205, the subordinate controller 33 determines whether the user has confirmed the message 20. If the information indicating that the message 20 has been confirmed is obtained, the determination at step S205 is YES, and the subordinate controller 33 proceeds to step S207. If the information indicating that the message 20 has been confirmed is not obtained, the determination at step S205 is NO, and the subordinate controller 33 proceeds to step S206.

At step S206, the subordinate controller 33 determines whether a predetermined time period has elapsed since output of the message 20. The predetermined time period may be, for example, several minutes. The predetermined time period may be, for example, a time period taken for record fixing or a time period taken for drying of the surface of the medium 18.

If the predetermined time period has not elapsed, the determination at step S206 is NO, and the subordinate controller 33 proceeds to step S205. The subordinate controller 33 waits until information indicating that the message 20 has been confirmed is acquired or until a predetermined time period has elapsed. If the predetermined time period has elapsed, the determination at step S206 is YES, and the subordinate controller 33 proceeds to step S207.

At step S207, the subordinate controller 33 determines whether to continue to report the message 20. If information indicating that the message 20 is unnecessary is obtained, the determination at step S207 is NO, and the subordinate controller 33 proceeds to step S208. At step S208, the subordinate controller 33 sets the second flag to 0.

If the information indicating that the message 20 is unnecessary is not obtained, the determination at step S207 is YES, and the subordinate controller 33 proceeds to step S209 while the second flag remains set to 1. At step S209, the subordinate controller 33 completes reporting.

Operations of Embodiment

Operations of the present embodiment will be described.

When the predetermined medium 18 is set as an object on which recording is to be performed, at least one of the external controller 13 and the subordinate controller 33 outputs the message 20 that provides a warning not to touch the recording surface 18f of the predetermined medium 18. That is, the external controller 13 may cause the display 16 to display the message 20. The subordinate controller 33 may cause the reporter 22 to report the message 20. The reporter 22 may report the message 20 output by the subordinate controller 33. When causing the message 20 to be reported by the reporter 22, the subordinate controller 33 may stop reporting the message 20 upon lapse of a predetermined time period after causing the message 20 to be reported.

When, on the setting screen 19, the predetermined medium 18 is selected and the first discharger 31 is set as a discharger that discharges the predetermined medium 18, the external controller 13 may output the message 20. That is, when the predetermined medium 18 is discharged by the first discharger 31, the external controller 13 causes the reporter 22 to report the message 20.

Effects of Embodiment

Effects of the present embodiment will be described.

(1) When the predetermined medium 18 is set as an object on which recording is to be performed, the message 20 is output. The message provides a warning not to touch the recording surface 18f of the predetermined medium 18 on which recording is performed. The ease of drying of the recording surface 18f varies depending on, for example, the type of the medium 18, and therefore a medium 18 that does not easily dry may be set as an object on which recording is to be performed. Even in such a case, output of the message 20 may reduce the chance of the user touching the recording surface 18f. Therefore, the decrease in recording quality may be reduced.

(2) When the predetermined medium 18 is selected on the setting screen 19, the external controller 13 outputs the message 20 that provides a warning not to touch the recording surface 18f. Therefore, it may be reported, prior to start of recording, that attention is to be paid to the handling of the selected medium 18.

(3) When the predetermined medium 18 is selected and the first discharger 31 is set as a discharger that discharges the predetermined medium 18, the external controller 13 outputs the message 20 that provides a warning not to touch the recording surface 18f. Therefore, it may be reported, prior to start of recording, that, for the recording, attention is to be paid to the handling of the selected medium 18.

(4) When the predetermined medium 18 is selected, the external controller 13 sets the first discharger 31 as a discharger that discharges the predetermined medium 18. Therefore, the trouble of the user may be reduced relative to the case where the user sets the discharger.

(5) Regarding the medium 18 discharged by the second discharger 32, the user is able to see the recording surface 18f. Therefore, the recording surface 18f is less likely to be touched unintentionally. In this regard, when the second discharger 32 is set, the external controller 13 does not output the message 20 that provides a warning not to touch the recording surface 18f. Therefore, output of the message 20 may be focused on the case of setting the first discharger 31 when the recording surface 18f is highly likely to be touched.

(6) The external controller 13 causes the message 20, which provides a warning not to touch the recording surface 18f, to be reported until receiving information indicating that the user has confirmed the message 20. Therefore, the user may be more prompted to pay attention.

(7) After receiving an input to start recording, the subordinate controller 33 outputs the message 20 that provides a warning not to touch the recording surface 18f. Therefore, the user may be prompted to pay attention after start of recording.

(8) After the medium 18 has been discharged, the subordinate controller 33 outputs the message 20 that provides a warning not to touch the recording surface 18f. This may decrease the time taken until the user picks up the medium 18 since the message 20 prompts the user to pay attention, and therefore the user may be more prompted to pay attention.

(9) The recording surface 18f of photo paper is more difficult to dry than that of another type of the medium 18. Furthermore, the recording surface 18f of photo paper is made glossy, and therefore scuffing the recording surface 18f results in a noticeable scuff. In this regard, since the message 20, which provides a warning not to touch the recording surface 18f, enables the user to be prompted to pay attention, reduction in quality may be suppressed even when recording is performed on photo paper.

(10) For example, when the external device 14 for making settings of the medium 18 and the recording device 12 that performs recording on the medium 18 are at separate locations, the user makes settings of the medium 18 and then moves to the recording device 12 to get the medium 18 on which recording is performed. In this case, if the message 20, which provides a warning not to touch the recording surface 18f, is displayed in the external device 14 for making settings of the medium 18, there is a possibility that the user would be unaware of the message 20. In this regard, the message 20, which provides a warning not to touch the recording surface 18f, is reported by the reporter 22 included in the recording device 12 and therefore may prompt the user to pay attention.

(11) The subordinate controller 33 stops reporting the message 20, which provides a warning not to touch the recording surface 18f, after the lapse of a predetermined time period. This may reduce the possibility that, for example, even when the recording device 12 is shared by a plurality of users, a warning to the preceding user would be left until the succeeding user uses the recording device 12.

(12) When the reading main body 23 is located above the first discharger 31, it is difficult to visually recognize the medium 18 discharged by the first discharger 31. Therefore, there is a chance that the user might carelessly touch the recording surface 18f. In this regard, since the message 20, which provides a warning not to touch the recording surface 18f, enables the user to be prompted to pay attention, reduction in quality may be suppressed even when the reading main body 23 is located above the first discharger 31.

Modifications

The present embodiment may be modified and performed as follows. The present embodiment and the following modifications may be performed in combination with each other as long as any technological contradiction does not arise.

The predetermined medium 18 may be, for example, a film made of resin, a sheet made of resin, a composite film of paper and resin, metal foil, a metal plate, a metal film, a composite film of resin and metal, a ceramic sheet, or the like. Examples of the composite film of paper and resin include resin impregnated paper and resin-coated paper. The composite film of resin and metal is, for example, a laminating film.

The predetermined medium 18 may be set in accordance with the length of the transport path 43 from the recorder 30 to the first discharger 31, the speed of transport of the medium 18, temperature, humidity, and so on. The medium 18 on which recording is performed by the recorder 30 is made dry and is penetrated by a liquid while being transported. Therefore, the medium 18 on which recording may be insufficiently fixed during transportation to the first discharger 31 may be assumed as the predetermined medium 18.

At least one of the first discharger 31 and the second discharger 32 may be disposed in a device different from the recording device 12. For example, the recording system 11 may include a discharge device including at least one of the first discharger 31 and the second discharger 32, separately from the recording device 12 including the recorder 30. The recording device 12 may deliver, to the discharge device, the medium 18 on which recording is performed. The discharge device may include a processing section that performs, for example, stapler processing of stapling a plurality of sheets of the medium 18, punch processing of punching a hole in the medium 18, and so on.

At least one of the external controller 13 and the subordinate controller 33 may output the message 20 even when the predetermined medium 18 is to be discharged by the second discharger 32.

At least one of the external controller 13 and the subordinate controller 33 may output the orientation of the recording surface 18f of the medium 18 to be discharged.

In the case of the recording device 12 capable of performing recording on both sides of the medium 18, at least one of the external controller 13 and the subordinate controller 33 may output information on whether recording is performed on one side or on both sides.

The recording device 12 may include neither the reading main body 23 nor the supports 24. The reporter 22 may be disposed in the device main body 25.

The reading main body 23 and the supports 24 may be integrally configured.

The first discharger 31 may discharge the medium 18 from the side surface of the device main body 25.

The time when the medium 18 is discharged from the first discharger 31 may be set using a time period that has elapsed since completion of recording or using the number of revolutions of a motor that drives the transporter 39. The time when the medium 18 is discharged may be set using a time period that has elapsed since detection of an end of the medium 18 by a sensor (not illustrated) disposed in the transport path 43 or using the number of revolutions of a motor that drives the transporter 39.

When the settings in the recording system 11 are initialized, for example, at least one of the first flag and the second flag may be set to 1.

The first flag and the second flag may be unified. When information indicating that the message 20 is unnecessary is input in the external device 14, reporting of the message 20 may also be stopped in the recording device 12. When information indicating that the message 20 is unnecessary is input in the recording device 12, reporting of the message 20 may also be stopped in the external device 14.

When outputting the message 20, the external controller 13 and the subordinate controller 33 may output the message 20, for example, until the lapse of a predetermined time period, regardless of information indicating that the user has confirmed the message 20.

The external controller 13 may execute the medium selection routine or the recording routine at at least one of times, a time after an input for starting recording on the predetermined medium 18 has been received and a time after the predetermined medium 18 has been discharged by the first discharger 31.

The recording device 12 may include the display 16 that displays the setting screen 19 for selecting the type of the medium 18. The subordinate controller 33 may execute the medium selection routine or the recording routine when the medium 18 is selected on the setting screen 19. When selection of the medium 18 is enabled in the recording device 12, the recording device 12 may not include the external device 14.

The output destination to which the external controller 13 outputs the message 20 may be the display 16 or may be the recording device 12.

The output destination to which the subordinate controller 33 outputs the message 20 may be the reporter 22 or may be the external device 14.

Upon the lapse of a predetermined time period after causing the display 16 to display the message 20, the external controller 13 may stop reporting the message 20.

The subordinate controller 33 may continue reporting until the user confirms the message 20 after the lapse of the predetermined time period.

The external controller 13 may output the message when the predetermined medium 18 is selected on the setting screen 19. The external controller 13 may output the message 20 without waiting for setting of a discharger that discharges the medium 18.

The subordinate controller 33 may output the message 20 when the predetermined medium 18 is selected on the setting screen 19. The subordinate controller 33 may output the message 20 without waiting for setting of a discharger that discharges the medium 18.

The external device 14 may include the reporter 22. The external device 14 may report the message 20 using, for example, sound, audio, and light. The external controller 13 may output the message 20 to the reporter 22 included in the external device 14.

The recording device 12 may be a liquid ejecting apparatus that performs recording by ejecting and discharging a liquid other than ink. The states of a liquid ejected as minute liquid droplets from the liquid ejecting apparatus include the state of a liquid that leaves a granular, tear-shaped, or thread-like tail. The term liquid as used herein may be any material that may be ejected from the liquid ejecting apparatus. For example, the liquid may be a material in a state where the substance is in the liquid phase, and examples of the liquid include a material in a liquid state in which the viscosity is high or low and a material in a liquid state, such as sol, gel water, and other inorganic solvents, organic solvents, solutions, liquid resins, liquid metals, and metallic melts. The liquid includes not only a liquid as one state of a substance but also ones in which particles of a functional material made of a solid material, such as a pigment or metal particles, dissolve, disperse, or are mixed in a solvent. Typical examples of the liquid include ink as mentioned in the embodiment described above and liquid crystal. The ink is assumed here to include various liquid compositions such as gel ink and hot melt ink, as well as typical water ink and oil ink. Specific examples of the liquid ejecting apparatus include a device that ejects a liquid containing a material, such as an electrode material or a color material, used for manufacturing, for example, a liquid crystal display, an electroluminescent display, a surface-emitting display, or a color filter, in a dispersed or dissolved state. The liquid ejecting apparatus may be a device that ejects a bioorganic substance used for biochip fabrication, a device that is used as a precision pipette and ejects a liquid serving as a sample, a print device, a microdispenser, or the like. The liquid ejecting apparatus may be a device that ejects lubricating oil at a pinpoint accuracy to a precision machine, such as a clock or a camera, or a device that ejects a transparent resin liquid, such as an ultraviolet-curing resin liquid, for forming a micro-hemispherical lens, an optical lens, or the like used in, for example, optical communication elements. The liquid ejecting apparatus may be a device that ejects an acid or alkaline etchant for etching, for example, a substrate.

Definitions

The expression "at least one" as used herein refers to "one or more" of desired options. By way of example, the expression "at least one" as used herein refers to "only one option" or "both of the two options" when the number of options is two. By way of another example, the expression "at least one" as used herein refers to "only one option" or "a combination of any of two or more options" when the number of options is three or more.

Appendices

Technical ideas understood from the embodiments and modifications described above and the operations and advantages will be described hereafter.

(A) A recording system includes a recorder configured to eject a liquid to perform recording on a recording surface of a medium; a first discharger being a discharger configured to discharge the medium on which recording is performed by the recorder, the first discharger being configured to discharge the medium with the recording surface facing down; a second discharger being a discharger configured to discharge the medium on which recording is performed by the recorder, the second discharger being configured to discharge the medium with the recording surface facing up; and a controller. In the recording system, the controller is configured to, when a predetermined medium is set as an object on which recording is to be performed, output a message that provides a warning not to touch the recording surface of the predetermined medium.

According to this configuration, when a predetermined medium is set as an object on which recording is to be performed, a message is output. The message provides a warning not to touch a recording surface of the predetermined medium on which recording is performed. The ease of drying of the recording surface varies depending on, for example, the type of medium. Even if a medium that does not easily dry is set as an object on which recording is to be performed, the chance of the user touching the recording surface may thus be reduced. Therefore, the decrease in recording quality may be reduced.

(B) In the recording system, the controller may be configured to output, to a display, a setting screen for selecting a type of the medium, and output the message when the predetermined medium is selected on the setting screen.

According to this configuration, when the predetermined medium is selected on the setting screen, the controller outputs the message that provides a warning not to touch the recording surface. Therefore, it may be reported, prior to start of recording, that attention is to be paid to the handling of the selected medium.

(C) In the recording system, the controller may be configured to output the message when, on the setting screen, the predetermined medium is selected and the first discharger is set as a discharger configured to discharge the predetermined medium.

According to this configuration, when the predetermined medium is selected and the first discharger is set as a discharger configured to discharge the predetermined medium, the controller outputs the message that provides a warning not to touch the recording surface. Therefore, it may be reported, prior to start of recording, that, for the recording, attention is to be paid to the handling of the medium.

(D) In the recording system, the controller may be configured to, when, on the setting screen, the predetermined medium is selected, set the first discharger as a discharger configured to discharge the predetermined medium.

According to this configuration, when the predetermined medium is selected, the controller sets the first discharger as a discharger that discharges the predetermined medium. Therefore, the trouble of the user may be reduced relative to the case where the user sets the discharger.

(E) In the recording system, when, on the setting screen, the predetermined medium is selected and the second discharger is set as a discharger configured to discharge the predetermined medium, the controller may be configured not to output the message.

Regarding the medium discharged by the second discharger, the user is able to see the recording surface. Therefore, the recording surface is less likely to be touched unintentionally. In this regard, according to this configuration, when the second discharger is set, the controller does not output the message that provides a warning not to touch the recording surface. Therefore, output of the message may be focused on the case of setting the first discharger where the recording surface is highly likely to be touched.

(F) In the recording system, the controller may be configured to, after outputting the message, cause the message to be reported until receiving information indicating confirmation of the message by a user.

According to this configuration, the controller causes a message, which provides a warning not to touch the recording surface, to be reported until receiving information indicating that the user has confirmed the message. Therefore, the user may be more prompted to pay attention.

(G) In the recording system, the controller may be configured to, after receiving an input to start recording on the predetermined medium, output the message.

According to this configuration, after receiving an input to start recording, the controller outputs a message that provides a warning not to touch the recording surface. Therefore, the user may be prompted to pay attention after start of recording.

(H) In the recording system, the controller may be configured to, after the predetermined medium is discharged by the first discharger, output the message.

According to this configuration, after the medium is discharged, the controller outputs the message that provides a warning not to touch the recording surface. This may decrease the time taken until the user picks up the medium since the message prompts the user to pay attention, and therefore the user may be more prompted to pay attention.

(I) In the recording system, the predetermined medium may be photo paper.

The recording surface of photo paper is more difficult to dry than that of other types of medium. Furthermore, the recording surface of photo paper is made glossy, and therefore scuffing the recording surface results in a noticeable scuff. In this regard, according to this configuration, since the message, which provides a warning not to touch the recording surface, enables the user to be prompted to pay attention, reduction in quality may be suppressed even when recording is performed on photo paper.

(J) The recording system may include a recording device including the recorder, the first discharger, the second discharger, and a reporter configured to report the message output by the controller.

For example, when a device for making settings of the medium and the recording device that performs recording on the medium are at separate locations, the user makes settings of the medium and then moves to the recording device to get the medium on which recording is performed. In this case, if a message, which provides a warning not to touch the recording surface, is displayed in the device for making settings of the medium, there is a possibility that the user would be unaware of the message. In this regard, according to this configuration, since the message, which provides a warning not to touch the recording surface, is reported by the reporter included in the recording device, the user may be prompted to pay attention.

(K) In the recording system, the controller is configured to, when causing the message to be reported by the reporter, stop reporting the message upon lapse of a predetermined time period after causing the message to be reported.

According to this configuration, after the lapse of a predetermined time period, the controller stops reporting the message that provides a warning not to touch the recording surface. This may reduce the possibility that, for example, even when the recording device is shared by a plurality of users, a warning to the preceding user would be left until the succeeding user uses the recording device.

(L) The recording system may further include a device main body including the recorder, the first discharger, and the second discharger, and a reading main body including a reader configured to read an original document. The reading main body is disposed above the device main body in a vertical direction, and the first discharger is disposed between the device main body and the reading main body in the vertical direction.

If the reading main body is located above the first discharger, it is difficult to visually recognize the medium discharged by the first discharger. Therefore, there is a chance that the user might carelessly touch the recording surface. In this regard, according to this configuration, since the message, which provides a warning not to touch the recording surface, enables the user to be prompted to pay attention, reduction in quality may be suppressed even when the reading main body is located above the first discharger.

(M) A recording device includes a recorder configured to eject a liquid to perform recording on a recording surface of a medium; a first discharger being a discharger configured to discharge the medium on which recording is performed by the recorder, the first discharger being configured to discharge the medium with the recording surface facing down; a second discharger being a discharger configured to discharge the medium on which recording is performed by the recorder, the second discharger being configured to discharge the medium with the recording surface facing up; a reporter; and a controller. The controller is configured to, when a predetermined medium is discharged by the first discharger, cause the reporter to report a message that provides a warning not to touch the recording surface of the predetermined medium. According to this configuration, the same advantages as those of the recording system described above may be attained.

(N) Disclosed is a control method for controlling a recording device including a recorder configured to eject a liquid to perform recording on a recording surface of a medium, a first discharger being a discharger configured to discharge the medium on which recording is performed by the recorder, the first discharger being configured to discharge the medium with the recording surface facing down, and a second discharger being a discharger configured to discharge the medium on which recording is performed by the recorder, the second discharger being configured to discharge the medium with the recording surface facing up. The control method includes, when a predetermined medium is set as an object on which recording is to be performed, outputting a message that provides a warning not to touch the recording surface of the predetermined medium. According to this method, the same advantages as those of the recording system described above may be attained.

What is claimed is:

1. A recording system comprising:
a recorder configured to eject a liquid to perform recording on a recording surface of a medium;
a first discharger configured to discharge the medium on which recording is performed by the recorder, the first discharger being configured to discharge the medium with the recording surface facing down;
a second discharger configured to discharge the medium on which recording is performed by the recorder, the second discharger being configured to discharge the medium with the recording surface facing up; and
a controller;
wherein the controller performs a medium selection process including:
determining if a predetermined medium is set as an object on which recording is to be performed,
determining which of the first discharger or the second discharger is selected, and
outputting a message that provides a warning not to touch the recording surface of the predetermined medium when it is determined that the predetermined medium is set as an object on which recording is to be performed.

2. The recording system according to claim 1, wherein the controller is configured to output, to a display, a setting screen for selecting a type of the medium, and output the message when the predetermined medium is selected on the setting screen.

3. The recording system according to claim 2, wherein the controller is configured to output the message when, on the setting screen, the predetermined medium is selected and the first discharger is set as a discharger configured to discharge the predetermined medium.

4. The recording system according to claim 2, wherein the controller is configured to, when, on the setting screen, the predetermined medium is selected, set the first discharger as a discharger configured to discharge the predetermined medium.

5. The recording system according to claim 2, wherein the controller is configured not to output the message when, on the setting screen, the predetermined medium is selected and the second discharger is set as a discharger configured to discharge the predetermined medium.

6. The recording system according to claim 2, wherein the controller is configured to, after outputting the message, cause the message to be reported until receiving information indicating confirmation of the message by a user.

7. The recording system according to claim 1, wherein the controller is configured to, after receiving an input to start recording on the predetermined medium, output the message.

8. The recording system according to claim 1, wherein the controller is configured to, after the predetermined medium is discharged by the first discharger, output the message.

9. The recording system according to claim 1, wherein the predetermined medium is photo paper.

10. The recording system according to claim 1, further comprising:
a recording device including the recorder, the first discharger, the second discharger, and
a reporter configured to report the message output by the controller.

11. The recording system according to claim 10, wherein the controller is configured to, when causing the message to be reported by the reporter, stop reporting the message upon lapse of a predetermined time period after causing the message to be reported.

12. The recording system according to claim 1, further comprising:
a device main body including the recorder, the first discharger, and the second discharger; and
a reading main body including a reader configured to read an original document, wherein
the reading main body is disposed above the device main body in a vertical direction, and
the first discharger is disposed between the device main body and the reading main body in the vertical direction.

13. The recording system according to claim 1, wherein the controller includes one or both of an external controller disposed outside a recording device and an internal controller disposed inside the recording device.

14. A recording device comprising:
a recorder configured to eject a liquid to perform recording on a recording surface of a medium;
a first discharger configured to discharge the medium on which recording is performed by the recorder, the first discharger being configured to discharge the medium with the recording surface facing down;
a second discharger configured to discharge the medium on which recording is performed by the recorder, the second discharger being configured to discharge the medium with the recording surface facing up;
a reporter; and
a controller,
wherein the controller performs a medium selection process including:
determining if a predetermined medium is set as an object on which recording is to be performed,
determining which of the first discharger or the second discharger is selected, and causing the reporter to report a message that provides a warning not to touch the recording surface of the predetermined medium when it is determined that the predetermined medium is set as an object on which recording is to be performed.

15. A control method for controlling a recording device including a recorder configured to eject a liquid to perform recording on a recording surface of a medium, a first discharger configured to discharge the medium on which recording is performed by the recorder, the first discharger being configured to discharge the medium with the recording surface facing down, and a second discharger configured to discharge the medium on which recording is performed by the recorder, the second discharger being configured to discharge the medium with the recording surface facing up, the control method comprising:

determining if a predetermined medium is set as an object on which recording is to be performed, determining which of the first discharger or the second discharger is selected, and outputting a message that provides a warning not to touch the recording surface of the predetermined medium when it is determined that the predetermined medium is set as an object on which recording is to be performed.

* * * * *